(12) United States Patent
Jiang et al.

(10) Patent No.: US 10,397,882 B2
(45) Date of Patent: Aug. 27, 2019

(54) COMPOUND MOBILE COMMUNICATION METHOD, TERMINAL AND SYSTEM FOR NUCLEAR POWER PLANT

(71) Applicants: China Nuclear Power Engineering Co., Ltd., Shenzhen, Guangdong (CN); China General Nuclear Power Group, Shenzhen, Guangdong (CN)

(72) Inventors: Shangyue Jiang, Guangdong (CN); Wei Huang, Guangdong (CN)

(73) Assignees: China Nuclear Power Engineering Co., Ltd., Shenzhen (CN); China General Nuclear Power Group, Shenzhen (CN)

( * ) Notice: Subject to any disclaimer, the term of this patent is extended or adjusted under 35 U.S.C. 154(b) by 189 days.

(21) Appl. No.: 15/289,997

(22) Filed: Oct. 11, 2016

(65) Prior Publication Data

US 2017/0070963 A1    Mar. 9, 2017

Related U.S. Application Data (63) Continuation of application No. PCT/CN2014/093428, filed on Dec. 10, 2014.

(30) Foreign Application Priority Data

Apr. 11, 2014    (CN) .......................... 2014 1 0146678

(51) Int. Cl.
*H04W 52/28*    (2009.01)
*H04M 1/725*    (2006.01)
(Continued)

(52) U.S. Cl.
CPC ..... *H04W 52/283* (2013.01); *H04M 1/72572* (2013.01); *H04M 1/737* (2013.01);
(Continued)

(58) Field of Classification Search
None
See application file for complete search history.

(56) References Cited

FOREIGN PATENT DOCUMENTS

| CN | 101841595 A | 9/2010 |
|---|---|---|
| CN | 102256013 A | 11/2011 |

OTHER PUBLICATIONS

International Search Report of PCT Patent Application No. PCT/CN2014/093428 dated Mar. 11, 2015.

*Primary Examiner* — Darren E Wolf (57) ABSTRACT

The present invention provides a compound mobile communication method for a nuclear power plant, including the steps of: receiving a communication signal sent by a base station in a restricted area or an unrestricted area, the communication signal including a coded-modulation optical signal and/or an electromagnetic wave signal; judging the communication signal received; and reducing transmission power or not transmitting the electromagnetic wave signal if the communication signal is a coded-modulation optical signal or a wireless electromagnetic wave communication signal sent by a base station in the restricted area. The compound mobile communication method for a nuclear power plant of the present invention can meet the requirements of mobile communication in special places without electromagnetic interference. The present invention also provides a compound mobile communication terminal and system for a nuclear power plant.

18 Claims, 3 Drawing Sheets

(51) Int. Cl.
*H04M 1/737* (2006.01)
*H04M 3/42* (2006.01)
*H04W 48/04* (2009.01)
*H04B 10/40* (2013.01)
*H04B 10/50* (2013.01)
*H04B 10/60* (2013.01)

(52) U.S. Cl.
CPC ....... *H04M 3/42051* (2013.01); *H04W 48/04* (2013.01); *H04B 10/40* (2013.01); *H04B 10/50* (2013.01); *H04B 10/60* (2013.01); *Y02D 70/00* (2018.01); *Y02D 70/1222* (2018.01)

COMPOUND MOBILE COMMUNICATION METHOD, TERMINAL AND SYSTEM FOR NUCLEAR POWER PLANT

CROSS REFERENCE TO RELATED APPLICATIONS

This application is a continuation application of PCT Application No. PCT/CN2014/093428, filed on Dec. 10, 2014, which claims priority to Chinese Patent Application No. 201410146678.0, filed on Apr. 11, 2014, the entire contents of which are incorporated herein by reference.

TECHNICAL FIELD

The present invention generally relates to nuclear power technology and, more particularly, relates to a compound mobile communication method, terminal and system for a nuclear power plant.

BACKGROUND

With the rapid development of electronic technology and communication technology, mobile communication technology has been more and more popular in our daily life, which can greatly facilitate our life and production. There are potential safety risks in a nuclear power plant, i.e. nuclear safety, which is quite different from the potential safety risks in conventional power stations. When a nuclear accident occurs due to equipments, management or natural disaster, the uncontrollable radioactive nuclide will be released to the surroundings, which will lead to radioactive pollution. In order to control or mitigate the nuclear accident, various laws and regulations have been made to ensure normal communication in a nuclear accident emergency. According to actual situation, a series of emergency commands and communication systems have been step up, including wired communication system, wireless communication system, broadcast and sound alarm system.

Wireless communication system mainly refers to a paging system which can be connected to a special purpose switch or a public network switch. Paging person is accessed to an automatic paging system or an artificial paging system via a phone call, sends phone numbers or text information. The paging system is generally provided with an operating terminal for facilitating the management of the administrator. The staff members in the emergency command center and the main control room can send messages (including emergency information) to all of or part of the staff members having a paging terminal via the operating terminal. In the nuclear power plant, according to the safety management regulations of the nuclear power plant, mobile communication terminals which can transmit radio signals, for instance a cell phone and a PHS are not allowed to enter the nuclear power plant, because these mobile communication terminals are both two-way communication terminals. The wireless signal sent by the mobile communication terminal may cause electromagnetic interference to the nuclear primary instrumentation, the secondary protection system and the DCS system. In order to avoid electromagnetic interference, on the one hand, certain areas in the nuclear power plant are managed accordingly, for instance setting up prohibited area for using the communication terminal where two-way communication mobile terminal cannot be used. On the other hand, the paging system used in the mobile communication system in the nuclear power plant only has single function and cannot meet the actual requirements of wireless communication in the nuclear power plant.

In view of the foregoing, what is needed, therefore, is to provide a compound mobile communication method, terminal and system for a nuclear power plant.

BRIEF SUMMARY OF VARIOUS EMBODIMENTS OF THE INVENTION

One object of the present invention is to provide a compound mobile communication method, terminal and system for a nuclear power plant.

According to one embodiment of the present invention, a compound mobile communication method for a nuclear power plant, including the steps of:

receiving a communication signal sent by a base station in a restricted area or an unrestricted area, the communication signal including a coded-modulation optical signal and/or an electromagnetic wave signal;

judging the communication signal received; and reducing transmission power or not transmitting the electromagnetic wave signal if the communication signal is a coded-modulation optical signal or a wireless electromagnetic wave communication signal sent by a base station in the restricted area.

According to one aspect of the present invention, if the communication signal is an electromagnetic wave signal sent by a base station in the unrestricted area, transmitting the electromagnetic wave signal normally.

According to one aspect of the present invention, the restricted area is an area which restricts transmission of the electromagnetic wave signal or an area where reduction of transmission power is needed, and a remaining area is an unrestricted area.

According to one aspect of the present invention, the compound mobile communication method includes the step of not transmitting electromagnetic wave signal if the communication signal is not a coded-modulation optical signal or an electromagnetic wave signal available.

According to one aspect of the present invention, the compound mobile communication method includes the step of displaying current location information, the current location information includes the location information of the restricted area and the unrestricted area.

According to one aspect of the present invention, the compound mobile communication method further includes the step of: if the communication signal is a call request and the current location information is a restricted area, connecting the call request via a coded-modulation optical signal or connecting the call request via a wireless electromagnetic wave with a reduced transmission power.

According to one aspect of the present invention, the compound mobile communication method further includes the step of playing identification information of the call request in voice prior to connecting the call request.

According to one aspect of the present invention, the coded-modulation optical signal or the electromagnetic wave communication signal is a voice signal or a multimedia signal.

According to one aspect of the present invention, the step of judging the communication signal received including: identifying an identification code of the communication signal received, determining the communication signal as a coded-modulation optical signal if the identification code of the communication signal is an identification code of an optical signal, and determining the communication signal as an electromagnetic wave signal if the identification code of the communication signal is an identification code of an electromagnetic wave signal.

According to one aspect of the present invention, the restricted area includes a nuclear island, a conventional island, a circulating pump house and a main switch station.

According to one embodiment of the present invention, a compound mobile communication terminal for a nuclear power plant is provided. The compound mobile communication terminal for nuclear power plant includes:

a receiver unit, configured to receive a communication signal sent by a base station in a restricted area or an unrestricted area, the communication signal including a coded-modulation optical signal and/or an electromagnetic wave signal;

a judgment unit, configured to judge the communication signal received; and a control unit, configured to reduce a transmission power or not transmit an electromagnetic wave signal if the communication signal is a coded-modulation optical signal or a wireless electromagnetic wave communication signal sent by a base station in the restricted area.

According to one aspect of the present invention, the control unit is further configured to transmit the electromagnetic wave signal normally if the communication signal is an electromagnetic wave signal sent by a base station in an unrestricted area.

According to one aspect of the present invention, the control unit is further configured to not transmit the electromagnetic wave signal if the communication signal is not a coded-modulation optical signal or an electromagnetic wave communication signal available.

According to one aspect of the present invention, the compound mobile communication terminal includes a display unit configured to display current location information, and the current location information includes a restricted area and an unrestricted area.

According to one aspect of the present invention, the control unit is configured to connect the call request via a coded-modulation optical signal or connect the call request via a wireless electromagnetic wave with reduced transmission power, if the communication signal is a call request and the current location information is a restricted area.

According to one aspect of the present invention, the control unit is further configured to play the identification information of the call request in voice prior to connecting the call request.

According to one aspect of the present invention, the coded-modulation optical signal or the electromagnetic wave signal is a voice signal or a multimedia signal.

According to one aspect of the present invention, the restricted area includes a nuclear island, a conventional island, a circulating pump house and a main switch station.

According to one embodiment of the present invention, a compound mobile communication system for a nuclear power plant is provided. The compound mobile communication system for a nuclear power plant includes:

a base station module, configured to transmit communication signal in a restricted area or an unrestricted area, the communication signal including a coded-modulation optical signal and/or an electromagnetic wave signal; and a mobile terminal module, configured to receive the communication signal and judge the communication signal received, a transmission power is reduced or no electromagnetic wave signal is transmitted if the communication signal received is judged to be a coded-modulation optical signal or an electromagnetic wave signal sent by a base station in a restricted area.

According to one aspect of the present invention, an electromagnetic wave signal is transmitted normally if the communication signal received by the mobile terminal module is an electromagnetic wave signal sent by a base station in an unrestricted area.

According to one aspect of the present invention, no electromagnetic wave signal is transmitted if the communication signal received by the mobile terminal module is not a coded-modulation optical signal or an electromagnetic wave signal available.

According to one aspect of the present invention, the mobile terminal module is further configured to display current location information and the current location information includes a restricted area and an unrestricted area.

According to one aspect of the present invention, the mobile terminal module is further configured to connect a call request via a coded-modulation optical signal, or connect the call request via a wireless electromagnetic wave with reduced transmission power if the communication signal is a call request and the current location information is a restricted area.

According to one aspect of the present invention, the mobile terminal module is further configured to play identification information of the call request in voice prior to connecting the call request.

According to the embodiment of the present invention, the communication signal received is judged. When coded-modulation optical signal is received, the transmitting power is reduced or no electromagnetic wave signal is transmitted. When no coded-modulation optical signal is received and an available wireless electromagnetic wave communication signal is received, the electromagnetic wave is transmitted normally, so as to realize mobile communication interaction in location which has special requirements for communication.

When a user handholding a special purpose mobile communication terminal according to the present invention enters an unrestricted area from a restricted area, or enters a restricted area from an unrestricted area, the compound mobile communication terminal can realize automatic switching. In the restricted area, the special purpose mobile communication terminal of the present invention does not transmit electromagnetic wave signal. Two-way communication can be realized via optical communication, which won't cause electromagnetic interference to nuclear primary instrumentation, secondary protection and digital control system. Alternatively, in the restricted area, the transmitting power is reduced, so as to realize two-way communication with lower transmit power and reduce electromagnetic interference to other equipments. In the unrestricted area, the special purpose mobile communication terminal can receive and transmit wireless electromagnetic wave signal, to realize two-way communication. For some locations which have special requirements to the communication, the special purpose mobile communication terminal of the present invention can realize convenient wireless communication readily.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

It should be understood that, in the present application a restricted area refers to an area which is sensitive to electromagnetic compatibility and does not allow transmission of electromagnetic wave or needs to reduce the transmission power. An unrestricted area refers to an area which allows normal transmission of the electromagnetic waves. In other words, in a restricted area, electromagnetic waves will affect the electronic equipments and the electrical instruments. In the restricted area, in the compound communication method according to the present invention, no electromagnetic wave signal is transmitted. The two-way communication can realized via optical communication. Alternatively, in the restricted area, the transmission power is reduced, to realize two-way communication at a lower transmission power. In the unrestricted area, the electromagnetic wave does not affect the electronic equipments and the electrical instruments. Alternatively, there is no electronic equipment or electrical instrument in the unrestricted area. In the unrestricted area, the special communication terminal can transmit the electromagnetic wave normally, and can be used as terminal of two-way communication system, such as a cell phone.

Figure 1:
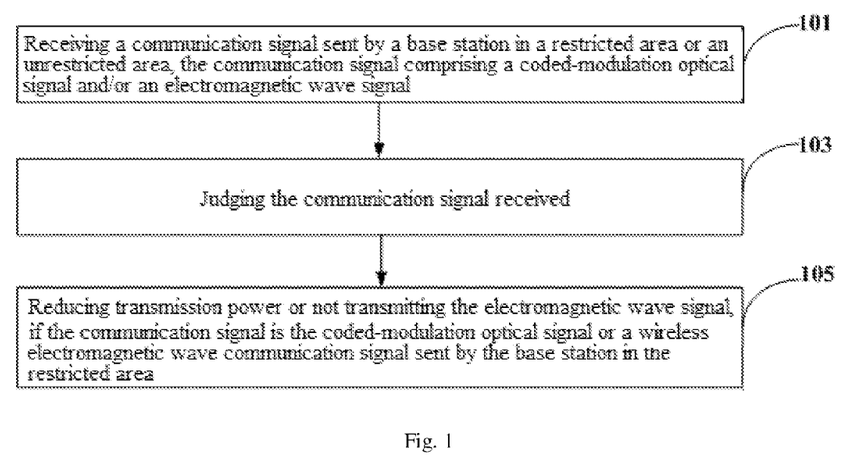
FIG. 1 shows a flowchart of a compound mobile communication method for nuclear power plant according to one embodiment of the present invention.

Referring to FIG. 1, a compound mobile communication method for a nuclear power plant according to one embodiment of the present invention includes the steps of:

Step 101, receiving a communication signal sent by a base station in a restricted area or an unrestricted area, the communication signal including a coded-modulation optical signal and/or an electromagnetic wave signal.

Specifically, the mobile communication terminal receives the communication signals sent by base stations in a restricted area and an unrestricted area respectively. The communication signal can include a coded-modulation optical signal and/or an electromagnetic wave signal. The mobile communication terminal can be any mobile communication device which can receive and transmit signals, such as a cell phone, a panel computer or a digital frame.

Step 103, judging the communication signal received.

Specifically, the mobile communication terminal identifies an identification code of the communication signals received. If the identification code of the communication signal is an optical signal identification code, the communication signal is a coded-modulation optical signal. If the identification code of the communication signal is an identification code of an electromagnetic wave signal, the communication signal is an electromagnetic wave signal.

If the identification code of the communication signal includes the identification code of an electromagnetic wave signal and the identification code of an optical signal, the communication signal includes the coded-modulation optical signal and the electromagnetic wave signal.

Step 107, reducing transmission power or not transmitting the electromagnetic wave signal, if the communication signal is a coded-modulation optical signal or a wireless electromagnetic wave communication signal sent by a base station in the restricted area.

Specifically, if the communication signal received is an electromagnetic wave signal sent by a base station in an unrestricted area, the electromagnetic wave signal is transmitted normally.

Specifically, if the communication signal received is not a coded-modulation optical signal or an electromagnetic wave signal, no electromagnetic wave signal is transmitted.

More specifically, the mobile communication terminal can display current location information. The location information includes a restricted area or an unrestricted area. If the communication signal is a call request and the current location information is a restricted area, the call request is connected via a coded-modulation optical signal or connected via a wireless electromagnetic wave with reduced transmission power.

Alternatively, prior to connecting the communication signal, the identification information of the call request is played with voice.

Specifically, the coded-modulation optical signal or the wireless electromagnetic wave communication signal can be a voice signal or a multimedia signal.

According to the embodiment of the present invention, the communication signal received is judged. When a coded-modulation optical signal is received, the transmission power is reduced or no electromagnetic wave signal is transmitted. When no coded-modulation optical signal is received and an available wireless electromagnetic wave communication signal is received, the electromagnetic wave signal is transmitted normally, so as to realize mobile communication interaction in a location which has special requirements for communication.

Figure 2:
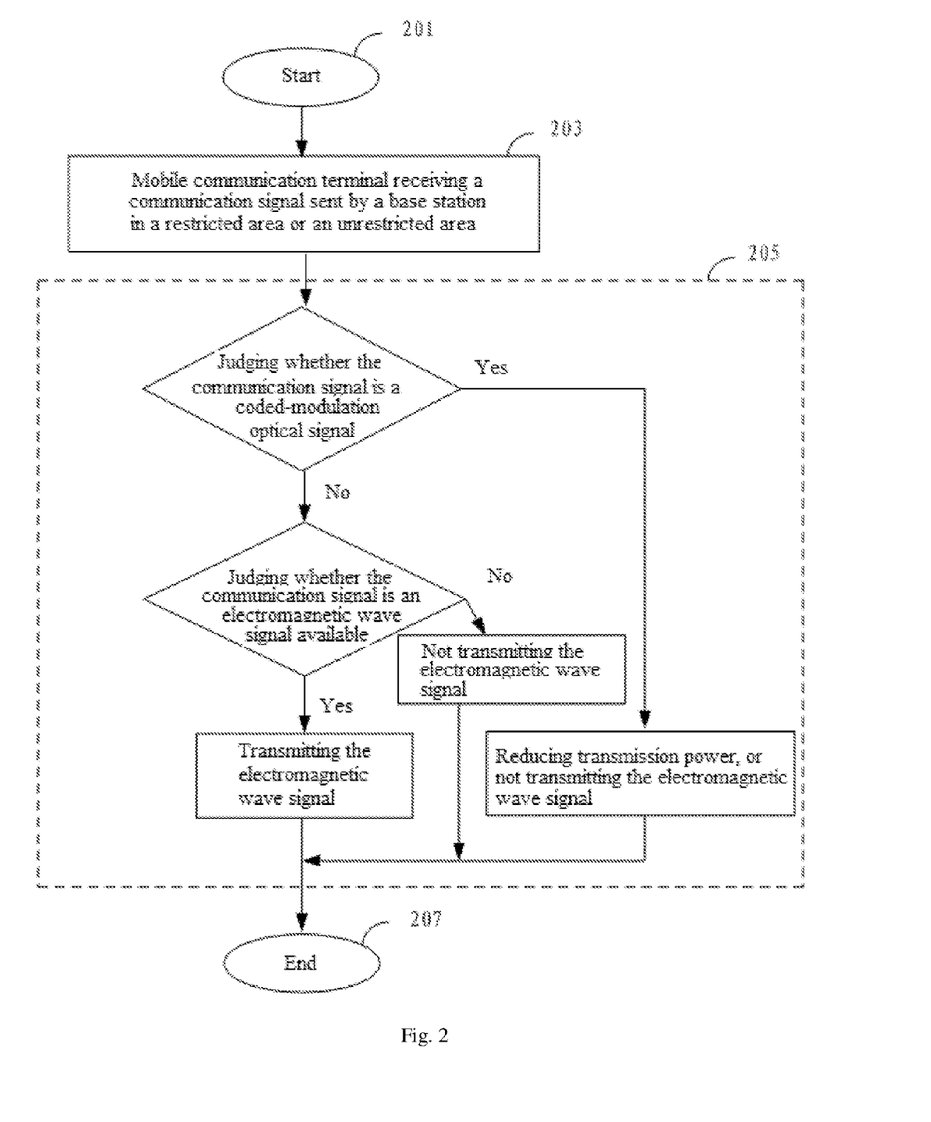
FIG. 2 shows another flowchart of the compound mobile communication method for nuclear power plant according to one embodiment of the present invention.

Referring to FIG. 2, FIG. 2 illustrates an embodiment of a compound mobile communication method for a nuclear power plant which includes the steps of:

Step 201, start;

Step 203, a mobile communication terminal receiving communication signals sent by base stations in a restricted area or an unrestricted area;

Step 205, judging the communication signal received. If the communication signal is a coded-modulation optical signal, the transmission power is reduced or no electromagnetic wave signal is transmitted. If the communication signal is not a coded-modulation optical signal but an available electromagnetic wave signal, the mobile communication terminal transmits the electromagnetic wave signal normally. If the communication signal is not a coded-modulation optical signal or an electromagnetic wave signal available, no electromagnetic wave signal is transmitted.

Specifically, the mobile communication terminal can display the current location information. The location information includes a restricted area and an unrestricted area. If the current location information is a restricted area, the call request received is connected via a coded-modulation optical signal, or the transmission power is reduced to receive the call request via an electromagnetic wave with a lower transmission power.

Alternatively, the coded-modulation optical signal or the electromagnetic wave communication signal can be a voice signal or a multimedia signal.

Step 207, end.

According to the embodiment of the present invention, in step 203, data information sent by a base station in a restricted area or an unrestricted area is received. In this case, in step 205, the data information is displayed or the data information is voice broadcasted.

When the present invention is used in a nuclear power plant, the nuclear power plant is divided into two areas, i.e. a restricted area and an unrestricted area. The restricted area includes a nuclear island, a conventional island, a circulating pump house and a main switch station. The remaining area of the nuclear power plant is the unrestricted area. Base station which can transmit the coded-modulation optical signal is seated in the restricted area. Base station which can transmit the wireless electromagnetic wave communication signal is seated in the unrestricted area.

When a user handholding a special purpose mobile communication terminal of the present invention enters an unrestricted area from a restricted area, or enters a restricted area from an unrestricted area, automatic switching can be realized. In the restricted area, the special purpose mobile communication terminal does not transmit the electromagnetic wave. Two-way communication can be realized via optical communication, which will not cause electromagnetic interference to the nuclear primary instrumentations, secondary protection and digital control systems. Alternatively, in the restricted area, the transmission power is reduced, so as to realize two-way communication with lower transmission power. In the unrestricted area, the special purpose mobile communication terminal can receive and transmit the wireless electromagnetic wave signal, to realize two-way communication, acting as a normal mobile terminal.

In the mobile communication system and method according to the embodiments of the present invention, the mobile terminal module or the mobile communication terminal in the restricted area and the unrestricted area can receive the broadcast, the multicast and the peer to peer SMS from a specific control station. At the same time, the mobile terminal module or the mobile communication terminal can receive the broadcast, the multicast and the peer to peer SMS from a special purpose mobile communication terminal in the unrestricted area. Generally, the specific control station is configured to send specific messages to specific staff member of a specific institution or organization. For instance, the control station of a nuclear power plant sends specific message of the nuclear power plant to the staff member of the nuclear power plant. The control station of a hospital sends specific message to specific medical staff of the hospital.

The special mobile communication terminal of the present invention and the terminals provided by the telecommunication service providers can communicate with each other in the unrestricted area. The special mobile communication terminal of the present invention can also receive the broadcast, the multicast and the peer to peer SMS from the terminals provided by the telecommunication service providers in the restricted area.

Specifically, in the special purpose mobile communication system and method of the present invention, the mobile terminal module or the mobile communication terminal still can be connected to the internet, such as connected to the internet in wireless access mode.

Figure 3:
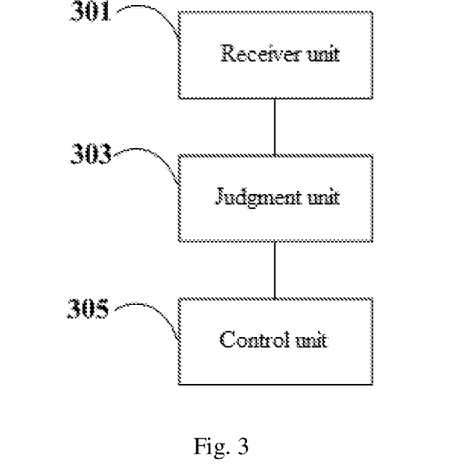
FIG. 3 shows a schematic view of a compound mobile communication terminal for nuclear power plant according to one embodiment of the present invention.

Referring to FIG. 3, FIG. 3 illustrates one embodiment of a compound mobile communication terminal for a nuclear power plant. The compound mobile communication terminal includes a receiver unit 301, a judgment unit 303 and a control unit 305.

The receiver unit 301 is configured to receive a communication signal sent by a base station in a restricted area or an unrestricted area. The communication signal includes a coded-modulation optical signal and/or an electromagnetic wave signal.

The judgment unit 303 is configured to judge the communication signal received.

The control unit 305 is configured to reduce the transmission power or not transmit the electromagnetic wave signal if the communication signal is a coded-modulation optical signal or an electromagnetic wave signal sent by a base station in the restricted area.

Specifically, the control unit 305 is configured to transmit the electromagnetic wave signal normally if the communication signal is an electromagnetic wave signal sent by a base station in the unrestricted area.

Specifically, the control unit 305 is further configured to not transmit the electromagnetic wave signal if the communication signal is not a coded-modulation optical signal or an electromagnetic wave signal available.

Alternatively, the mobile communication terminal also includes a display unit configured to display the current location information. The current location information includes a restricted area and an unrestricted area.

Alternatively, the control unit 305 is configured to connect a call request via a coded-modulation optical signal, or connect the call request via a wireless electromagnetic wave with reduced transmission power if the communication signal is a call request and the current location information is a restricted area.

Specifically, the control unit 305 is configured to play the identification information of the call request with voice prior to connecting the call request.

In the present embodiment, the control unit 305 includes a transmission circuit configured to transmit a coded-modulation optical signal or a wireless electromagnetic wave. In other embodiment of the present invention, the control unit 305 is separated from the transmission circuit. The control unit 305 transmits an enable signal to control the transmission of the electromagnetic wave signal of the transmission circuit or the reduction of the transmission power.

When a user handholding a special purpose mobile communication terminal according to the present invention enters a restricted area, a prompt message is displayed in the screen of the special purpose mobile communication terminal. When a call for connection the special purpose mobile communication terminal in the restricted area is received, the call is connected via a coded-modulation optical signal. Alternatively, the transmission power in the restricted area is reduced, to realize two-way communication via the wireless electromagnetic wave signal with a lower transmission power.

In addition, the special purpose mobile communication terminal of the present invention can be provided with a communication interface and an interface circuit for connecting the internet. The communication interface and the interface circuit can provide wireless connection with the internet.

According to the embodiment of the present invention, the communication signal received is judged. When a coded-modulation optical signal is received, the transmission power is reduced or no electromagnetic wave signal is transmitted. When no coded-modulation optical signal is received but an available wireless electromagnetic wave communication signal is received, the electromagnetic wave is transmitted normally.

When a user handholding a special purpose mobile communication terminal according to the present invention enters an unrestricted area from a restricted area, or enters a restricted area from an unrestricted area, the compound mobile communication terminal can realize automatic switching. In the restricted area, no electromagnetic wave signal is transmitted. Two-way communication can be realized via optical communication, which won't cause electromagnetic interference to the nuclear primary instrumentations, the secondary protection and digital control systems. Alternatively, the transmission power is reduced, to reduce electromagnetic interference to other equipments. In the unrestricted area, the special purpose mobile communication terminal can receive and transmit the wireless electromagnetic wave signal, to realize two-way communication. For some locations which have special requirements to the communication, the special purpose mobile communication terminal of the present invention can realize convenient wireless communication readily.

Figure 4:
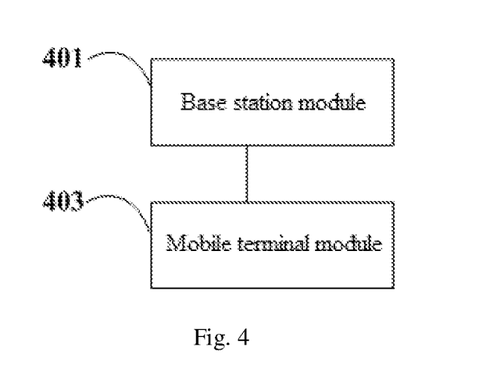
FIG. 4 shows a schematic view of a compound mobile communication system for nuclear power plant according to one embodiment of the present invention.

Referring to FIG. 4, FIG. 4 shows a schematic view of a compound mobile communication system for a nuclear power plant according to one embodiment of the present invention. The compound mobile communication system includes a base station module 401 and a mobile terminal module 403.

The base station module 401 is configured to transmit a communication signal in the restricted area and the unrestricted area. The communication signal includes a coded-modulation optical signal and/or a wireless electromagnetic wave signal.

The mobile terminal module 403 is configured to receive the communication signal and judge the communication signal received. If the communication signal is a coded-modulation optical signal or a wireless electromagnetic wave signal sent by a base station in the restricted area, the transmission power is reduced or no electromagnetic wave signal is transmitted.

Specifically, if the communication signal that the mobile terminal module 403 received is an electromagnetic wave signal sent by a base station in the unrestricted area, the electromagnetic wave signal is transmitted normally.

Specifically, if the communication signal that the mobile terminal module 403 received is not a coded-modulation optical signal or an electromagnetic wave signal available, no electromagnetic wave signal is transmitted.

Specifically, the mobile terminal module 403 is configured to display the current location information. The current location information includes a restricted area and an unrestricted area.

Specifically, if the communication signal is a call request and the current location information is a restricted area, the call request is connected via a coded-modulation optical signal, or connected via a wireless electromagnetic wave with reduced transmission power.

Alternatively, the mobile terminal module is configured to voice broadcast the identification information of the call request prior to connecting the call request.

In the present embodiment, the base station module 401 includes base stations for transmitting the coded-modulation optical signal and the electromagnetic wave signal set in a restricted area and an unrestricted area respectively. The mobile terminal module 403 is configured to receive the mobile communication signal sent by a base station module 401 and judge the mobile communication signal received, i.e., to judge the category and the signal strength of the mobile communication signal received. If the coded-modulation optical signal is received, the transmission power is reduced or no electromagnetic wave signal is transmitted. If no coded-modulation optical signal is received but the available wireless electromagnetic wave signal is received, the electromagnetic wave signal is transmitted normally.

In the special purpose mobile communication system of the present invention, the mobile terminal module 403 is configured to judge the mobile communication signal received. If the mobile terminal module 403 does not receive the coded-modulation optical signal or the available wireless electromagnetic wave communication signal, no electromagnetic wave signal is transmitted.

When a user handholding a special purpose mobile communication terminal of the present invention enters a restricted area, a prompt message is displayed in the screen of the special purpose mobile communication terminal. When a call for connection a special purpose mobile communication terminal in the restricted area is received, the call is connected via a coded-modulation optical signal. Alternatively, the transmission power in the restricted area is reduced, to transmit the wireless electromagnetic wave signal with a lower transmission power and realize two-way communication.

According to the embodiment of the special purpose mobile communication system of the present invention, the mobile terminal module 403 of is configured to receive data information sent by a base station in a restricted area and an unrestricted area, and display the data information.

In addition, the mobile terminal module 403 includes a voice playback device which can broadcast the data information in voice. In other words, any device or assembly which can obtain the data information accurately can also be coupled to the mobile terminal module 403 of the present invention.

The mobile terminal module 403 in the present embodiment has the functions of the compound mobile communication terminals in the previous embodiments of the present invention.

According to the embodiment of the present invention, the communication signal received is judged. When a coded-modulation optical signal is received, the transmission power is reduced or no electromagnetic wave signal is transmitted. When no coded-modulation optical signal is received but an available wireless electromagnetic wave communication signal is received, the electromagnetic wave is transmitted normally.

When a user handholding a special purpose mobile communication terminal of the present invention enters an unrestricted area from a restricted area, or enters a restricted area from an unrestricted area, the compound mobile communication terminal can realize automatic switching. In the restricted area, no electromagnetic wave signal is transmitted. Two-way communication can be realized via optical communication, which won't cause electromagnetic interference to the electronic instruments and the electrical equipments in the restricted area in the restricted area. Alternatively, the transmission power is reduced, so as to reduce electromagnetic interference to other equipments. In the unrestricted area, the special purpose mobile communication terminal can receive and transmit the wireless electromagnetic wave signal, to realize two-way communication. For some locations which have special requirements to the communication, the special purpose mobile communication terminal of the present invention can realize convenient wireless communication readily.

The method and process for implementing the system of the present invention are the same as detailed in the embodiment of the method of the present invention, and will not be detailed further.

According to the embodiments of the present invention, when a user handholding a special purpose mobile communication terminal of the present invention enters an unrestricted area from a restricted area, or enters a restricted area from an unrestricted area, the compound mobile communication terminal can realize automatic switching. In the restricted area, no electromagnetic wave signal is transmitted. Two-way communication can be realized via optical communication, which won't cause electromagnetic interference to the electronic instruments and the electrical equipments in the restricted area. Alternatively, the transmission power is reduced, so as to reduce electromagnetic interference to other equipments. In the unrestricted area, the special purpose mobile communication terminal can receive and transmit the wireless electromagnetic wave signal, to realize two-way communication. For some locations which have special requirements to the communication, the special purpose mobile communication terminal of the present invention can realize convenient wireless communication readily.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A compound mobile communication method for a nuclear power plant, comprising the steps of:
    receiving a communication signal sent by a base station in a restricted area or an unrestricted area, the communication signal comprising a coded-modulation optical signal and/or an electromagnetic wave signal;
    judging the communication signal received; and
    reducing transmission power or not transmitting the electromagnetic wave signal if the communication signal is a coded-modulation optical signal; transmitting the electromagnetic wave signal normally if the communication signal is not a coded-modulation optical signal but an electromagnetic wave signal available; not transmitting the electromagnetic wave signal if the communication signal is not a coded-modulation optical signal or an electromagnetic wave signal available.

2. The compound mobile communication method of claim 1, wherein the restricted area is an area which restricts transmission of the electromagnetic wave signal or an area where reduction of transmission power is needed, and a remaining area is an unrestricted area.

3. The compound mobile communication method of claim 1, further comprising the step of displaying current location information, the current location information comprises location information of a mobile device within the restricted area or the unrestricted area.

4. The compound mobile communication method of claim 3, further comprising the step of: after displaying current location information, if the communication signal is a call request and the current location information is a restricted area, connecting the call request via a coded-modulation optical signal or connecting the call request via a wireless electromagnetic wave with a reduced transmission power.

5. The compound mobile communication method of claim 4, further comprising the step of: playing identification information of the call request in voice prior to connecting the call request.

6. The compound mobile communication method of claim 5, wherein the coded-modulation optical signal or the electromagnetic wave communication signal is a voice signal or a multimedia signal.

7. The compound mobile communication method of claim 6, wherein the step of judging the communication signal received comprising: identifying an identification code of the communication signal received and determining the communication signal as a coded-modulation optical signal if the identification code of the communication signal is an identification code of an optical signal; and determining the communication signal as an electromagnetic wave signal if the identification code of the communication signal is an identification code of an electromagnetic wave signal.

8. The compound mobile communication method of claim 7, wherein the restricted area comprises a nuclear island, a conventional island, a circulating pump house and a main switch station.

9. A compound mobile communication terminal for a nuclear power plant, comprising:
    a receiver unit, configured to receive a communication signal sent by a base station in a restricted area or an unrestricted area, the communication signal comprising a coded-modulation optical signal and/or an electromagnetic wave signal;
    a judgment unit, configured to judge the communication signal received; and
    a control unit, configured to reduce a transmission power or not transmit an electromagnetic wave signal if the communication signal is a coded-modulation optical signal; to transmit the electromagnetic wave signal normally if the communication signal is an electromagnetic wave signal sent by a base station in an unrestricted area; and to not transmit the electromagnetic wave signal if the communication signal is not a coded-modulation optical signal or an electromagnetic wave communication signal available.

10. The compound mobile communication terminal of claim 9, further comprising a display unit configured to display current location information, the current location information comprises location information of a mobile device within the restricted area or the unrestricted area.

11. The compound mobile communication terminal of claim 10, wherein the control unit is configured to connect the call request via a coded-modulation optical signal or connect the call request via a wireless electromagnetic wave with reduced transmission power if the communication signal is a call request and the current location information is a restricted area after displaying current location information.

12. The compound mobile communication terminal of claim 11, wherein the control unit is further configured to play the identification information of the call request in voice prior to connecting the call request.

13. The compound mobile communication terminal of claim 9, wherein the coded-modulation optical signal or the electromagnetic wave signal is a voice signal or a multimedia signal.

14. The compound mobile communication terminal of claim 13, wherein the restricted area comprises a nuclear island, a conventional island, a circulating pump house and a main switch station.

15. A compound mobile communication system for a nuclear power plant, comprising:
a base station module, configured to transmit communication signal in a restricted area or an unrestricted area, the communication signal comprising a coded-modulation optical signal and/or an electromagnetic wave signal; and
a mobile terminal module, configured to receive the communication signal and judge the communication signal received, wherein a transmission power is reduced or no electromagnetic wave signal is transmitted if the communication signal received is judged to be a coded-modulation optical signal; an electromagnetic wave signal is transmitted normally if the communication signal received by the mobile terminal module is not a coded-modulation optical signal but an electromagnetic wave signal available; no electromagnetic wave signal is transmitted if the communication signal received by the mobile terminal module is not a coded-modulation optical signal or an electromagnetic wave signal available.

16. The compound mobile communication system of claim 15, wherein the mobile terminal module is further configured to display current location information, the current location information comprises location information of a mobile device within a restricted area or an unrestricted area.

17. The compound mobile communication system of claim 16, wherein the mobile terminal module is further configured to connect a call request via a coded-modulation optical signal, or connect the call request via a wireless electromagnetic wave with reduced transmission power if the communication signal is a call request and the current location information is a restricted area.

18. The compound mobile communication system of claim 15, wherein the mobile terminal module is further configured to play identification information of the call request in voice prior to connecting the call request.

* * * * *